United States Patent
Lima et al.

(10) Patent No.: US 7,799,881 B2
(45) Date of Patent: Sep. 21, 2010

(54) PROCESS FOR THE PREPARATION OF LATICES BASED ON POLYCHLORO-PRENE AND USE THEREOF AS ADHESIVES

(75) Inventors: Romano Lima, Godo (IT); Augusto Fabbri, Riccione (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 12/477,477

(22) Filed: Jun. 3, 2009

(65) Prior Publication Data

US 2009/0239989 A1  Sep. 24, 2009

Related U.S. Application Data

(63) Continuation of application No. 11/150,300, filed on Jun. 13, 2005, now abandoned.

(30) Foreign Application Priority Data

Jun. 15, 2004  (IT) .......................... MI2004A1194

(51) Int. Cl.
*C08F 257/02*  (2006.01)
(52) U.S. Cl. ........................ 526/201; 526/295; 524/834; 524/460; 524/552
(58) Field of Classification Search ................. 524/834, 524/460, 552; 526/201, 295
See application file for complete search history.

(56) References Cited

U.S. PATENT DOCUMENTS 3,912,676 A  10/1975  Brizzolara et al.
5,750,618 A  *  5/1998  Vogt et al. .................. 524/836

FOREIGN PATENT DOCUMENTS

| EP | 728774 | | 8/1996 |
| JP | 06248030 | | 9/1994 |
| JP | 06248030 A | * | 9/1994 |
| WO | WO 03/014176 | | 2/2003 |

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

A process is described for the preparation of latices based on polychloroprene, comprising the polymerization of chloroprene in the presence of a first latex essentially consisting of polymeric particles produced in a first polymerization of a composition of monomers comprising (a) alpha-, beta-unsaturated carboxylic acids and/or derivatives thereof, (b) vinyl aromatic compounds, (c) conjugated dienes; said first latex having a content of alpha-, beta-unsaturated carboxylic acids, expressed as parts of alpha-, beta-unsaturated carboxylic acids per 100 grams of polymeric particles, ranging from 1 to 15%, thus obtaining a final latex, the solid particles of said final latex having an quantity of chloroprene ranging from 50 to 95% by weight, preferably from 80 to 95% by weight.

25 Claims, No Drawings

PROCESS FOR THE PREPARATION OF LATICES BASED ON POLYCHLORO-PRENE AND USE THEREOF AS ADHESIVES

The present invention relates to the preparation of latices based on polychloroprene and the use thereof as adhesives.

Thanks to its crystalline properties, polychloroprene (PCP) is used as an adhesive in several fields. Due to environmental and toxicity problems caused by the use of PCP as an adhesive based on an organic solvent, over the last few years, users have preferred to increase the use of PCP in aqueous dispersion (water adhesive), in substitution of the classic adhesives.

There are applicative sectors in which particular performances are required for the water dispersions of PCP used as adhesive, such as the high initial adhesive power and high resistance to heat of the glue applied. In the latter applicative sector, the glued manufactured product is in fact required to resist to temperatures higher than 100° C. Under these conditions, the PCP homopolymer cannot guarantee a sufficient resistance of the adhesive, unless it is modified, for example by functionalizing it with carboxyl groups (JP-A-2002-121517), or by adding to the PCP dispersions other chemical compounds such as phenolic resins (EP-A-454,533) and isocyanates (U.S. Pat. No. 6,087,439, JP-A-2001-089737), or the carboxylic functionalisation is used, coupling it with the addition of isocyanate compounds in water dispersion (JP-A-2002-080807).

In all these cases, reinforcing chemical links are formed (cross-links) which guarantee a tacking resistance to very high temperatures.

The functionalisation of PCP with carboxylic groups can be effected by co-polymerizing chloroprene with a suitable acrylic monomer. Chloroprene, however, has a very poor tendency for co-polymerizing, in a significant manner, with almost all the known monomers, both carboxylic and non-carboxylic (with the only exception of 2,3-dichloro butadiene). Only a few vinyl monomers are used on an industrial level and in the majority of cases, the homo-polymerization of chloroprene mainly takes place. One of the few monomers which has a certain tendency for co-polymerizing, is methacrylic acid (MAA), which has a reactivity ratio of 0.15 with respect to 2.68 of chloroprene (High Polymers, vol. XVIII, Interscience, New York, 1964, page 720).

As the ratios are so unfavorable, the co-polymerization technology must include a synthesis with acidic pH (pH 2÷4) and with continuous feeding. In the former case (acidic pH) natural soaps (for example resinic acids) cannot be used, therefore certain tacking levels are not reached. In the second case, gel formation cannot be avoided as most of the polymer is generated at high conversion.

U.S. Pat. No. 4,128,514, U.S. Pat. No. 4,141,875, EP-A-451,998, U.S. Pat. No. 5,681,891, U.S. Pat. No. 6,034,173 and JP-A-2002-053703 are some preparation samples of water dispersions (or latices) of functionalized PCP with carboxylic groups.

It has now been found that the polymerization of chloroprene in the presence of a polymeric emulsion of a particular macro-monomer, produces latex having optimum adhesive properties, in particular cotton/cotton, wood/wood and wood/Formica, also at high temperatures.

In accordance with the above, the present invention relates to a process for the preparation of latices based on polychloroprene, which includes the polymerization of chloroprene in the presence of a first latex essentially consisting of polymeric particles produced in a first polymerization of a monomer composition comprising (a) $\alpha,\beta$-unsaturated carboxylic acids and/or derivatives thereof, (b) vinyl aromatic compounds, (c) conjugated dienes; the said first latex having a content of $\alpha,\beta$-unsaturated carboxylic acids, expressed as parts of $\alpha,\beta$-unsaturated carboxylic acids per 100 grams of polymeric particles, ranging from 1 to 15%, preferably from 2 to 8%; in this way, a final latex is obtained, whose solid particles have a chloroprene content of 50 to 95% by weight, preferably from 80 to 95% by weight.

In the preferred embodiment, the first latex essentially consists of polymeric particles obtained from a first polymerization of a composition of monomers comprising (a) $\alpha,\beta$-unsaturated carboxylic acids and/or derivatives thereof, in an amount of 2 to 25% by weight, preferably from 5 to 22% by weight, (b) vinyl aromatic compounds from 40 to 60% by weight, preferably from 42 to 48% by weight, (c) conjugated dienes from 20 to 55% by weight, preferably from 30 to 40% by weight, on the condition that the amount of $\alpha,\beta$-unsaturated carboxylic groups is that defined above.

As vinyl aromatic compounds, styrene, $\alpha$-methyl styrene, ethyl styrene, butyl styrene, dimethyl styrene, can be mentioned. In the preferred embodiment the vinyl aromatic compound is styrene.

Among the conjugated dienes, isoprene, 1,3-butadiene, 2,3-dichloro-1,3-butadiene, 1-chloro-1,3-butadiene are preferred, preferably 1,3-butadiene.

As far as the $\alpha,\beta$-unsaturated carboxylic acids and derivatives are concerned, typical examples are acrylonitrile, $C_1$-$C_4$ esters of acrylic and methacrylic acid (for example butyl (meth)acrylate, methyl (meth)acrylate, acrylamides and methacrylamides, salts of alkaline or alkaline-earth metals of acrylic and methacrylic acid. In the preferred embodiment, the $\alpha,\beta$-unsaturated carboxylic acids and related derivatives are selected from acrylonitrile, and salts of alkaline metals of the acrylic and methacrylic acid.

The first latex can also contain chloroprene, but in amounts not higher than 15%, preferably not higher than 10%.

The average dimensions of the particles of the first latex range from 1 nm to 1000 nm, preferably from 5 to 500 nm. The solid particle concentration with respect to the total weight of said first latex ranges from 3 to 50% by weight, preferably from 5 to 20% by weight.

Said first latex can be obtained through the usual radicalic polymerization techniques, which will be described in detail in relation to the chloroprene polymerization on the first latex.

Said first latex can be a pre-formed latex or a latex formed in situ. In the latter case, the process of the present invention will be in two steps, i.e. a first preparation step of the first aqueous latex, and a second preparation step of the final latex. In the case of the in situ formation of the first latex, any possible non-reacted monomers can be removed or left in the reactor and used in the second polymerization step with chloroprene.

The chloroprene polymerization on the first latex can be carried out in the presence of emulsifiers, both of the anionic and ionic type, and blends thereof. Typical examples of anionic emulsifiers are alkyl aryl sulphonates containing up to 18 carbon atoms in the alkyl chain, alkyl sulphates and alkyl sulphonates, the condensation products of formaldehyde with naphthalene sulphonic acid, sodium and potassium salts of resinic acids, oleic acid and fatty acids. In the preferred embodiment, the anionic emulsifiers are selected from sodium and/or potassium salts of resinic acids.

Typical examples of non-ionic emulsifiers are the condensation products of ethylene and/or propylene oxide with alkyl phenols.

The polymerization is started by radicals which can be generated by thermal decomposition (for example of peroxides and diazo-compounds) or by redox reaction (redox systems), the latter being preferred. Examples of redox systems include the combination of sodium peroxy disulphate/sodium dithionite, diisopropyl benzene hydroperoxide/sulphoxylated sodium formaldehyde. Other redox systems use bivalent iron as reducing agent in combination with auxiliary reducing agents (sulphoxylated sodium formaldehyde).

The polymerization temperature ranges from 5° C. to 120° C., preferably from 10° C. to 90° C.

The reaction pH can be acidic, neutral or basic. The pH can be regulated with the addition of a mineral acid or organic acids soluble in water, non-polymerizable, for example acetic acid; furthermore, the system can be buffered to avoid pH shifts during the reaction with sodium phosphate or carbonate.

The polymerization is carried out in the presence of molecular weight regulators for regulating both the gel and the molecular weight of the polymer without significantly altering the polymerization kinetics.

Typical examples of molecular weight regulators which can be used are dialkyl xanthogen disulphides containing linear or branched alkyl chains such as methyl, ethyl, propyl, isopropyl, butyl, hexyl, heptyl, octyl; alkyl mercaptans containing from 4 to 20 carbon atoms in the alkyl chain, such as, for example, butyl, hexyl, octyl, dodecyl, tridecyl mercaptans, and mixtures thereof.

The conversions used for the preparation of the final latex range from 60% to 100%, preferably from 70% to 99%, obtaining final solids ranging from 5% to 60% by weight, preferably from 30% to 50% by weight. At the end, the polymerization can be interrupted with the addition of a polymerization inhibitor, for example, phenothiazine, hydroxylamine sulphates, sodium tetrasulphide, sodium polysulphide mixed with mono-isopropyl hydroxylamine. The residual monomers can be optionally removed, for example by stripping in a vapour stream in a column.

The gel content of the final latex ranges from 0% to 90% by weight and can be regulated according to known methods using suitable quantities of a chain transfer agent, or by varying the polymerization temperature, conversion and crosslinking agent. The gel content is the percentage of polymer insoluble in tetrahydrofuran at 25° C. This is determined by dissolving 1 g of polymer in 100 ml of tetrahydrofuran under stirring for 24 hours, the insoluble polymer is filtered in a cascade at 325 mesh (macrogel) and 0.2 microns(microgel) and dried at 70° C. until a constant weight is obtained.

The solid particles of the final latex have a chloroprene content ranging from 50% to 95% by weight, preferably from 80 to 95% by weight. The average dimensions of the above particles range from 50 nm to 1500 nm and are regulated by the particle dimensions of the first latex and by the polymerization technology (batchwise or in semi-continuous).

The polymerization can be carried out in continuous, batchwise or in semi-continuous.

Ionic and/or non-ionic surface-active agents, aqueous solutions of potassium, sodium or ammonium hydroxide, can be added to the final composite latex thus obtained to stabilize the aqueous dispersion towards coagulation. Furthermore, in order to prevent the deterioration of the polymeric substrate towards oxidation, antioxidants can be added in a quantity of 0.1% to 5% by weight with respect to the weight of the polymer. The most common antioxidants which can be used are of the phenolic and aminic type.

The final latex thus obtained can be used as such as raw material or, after suitable coagulation treatment, transformed into rubber according to what is known in literature [High Polymer latices, D. C. Blackley, vol. 1, page 19 (1966)] and used in various sectors.

As far as other polymerization procedures are concerned, reference should be made to what is known in literature [High polymer Latices, D. C. Blackley, vol. 1, page 261 (1966); Encyclopedia of polymer Science and Technology].

In adhesive applicative fields for the gluing of cotton/cotton, wood/wood and wood/Formica, it is important to have an optimum tacking capacity which is both immediate and long-term, together with a high heat resistance of the glued product. It has been found that the latex obtained with the process of the present invention satisfies all these requirements. The latices prepared according to the present invention have in fact maintained excellent tacking capacities, on the same level as polychloroprene latices, also conferring an optimum heat resistance to the glued product.

The latices of the present invention can also be used as raw material in the field of adhesives and glues, in textile and cellulose impregnation, foams, dipping, modification of bitumens and cements and in coatings in general, or as rubber obtained from latex in the tyre industry, air springs, plastic material modifiers and other rubber articles.

The evaluations of the heat resistance were effected in an oven at an increasing temperature by subjecting test samples glued with the latex blend to be tested, to stretching until detachment. The blends were all prepared according to the base formulation indicated in Table 1.

TABLE 1

| formulation of the base blend (parts with respect to the dry product) | |
|---|---|
| Latex | 100 |
| Stabilizer (Vulcastab LW) | 1 |
| Antifoaming agent (Dehydran G) | 0.1 |
| Antioxidant (Wingstay L) | 2 |
| Resin (if present)* | 40 |
| ZnO | 5 |

*The blend can also be formulated without resin. The resin used was NOPCO$^R$ 2271 supplied by Henkel.

Preparation Method of the Test Samples 1) cotton/cotton gluing: cut strips of cotton 2×15 cm and pass two layers of base blend. After drying for 10 minutes, pass a third layer of blend and leave to dry for 15 minutes. Pair off the strips and pass them three times in a press for 30 seconds at a pressure of 6 Bar.

2) wood/wood and wood/Formica gluing: deposit, with the help of an applier, a layer of base blend having a thickness of 0.35 mm onto one of the two test samples (length of test sample 100 mm, width 20 mm and thickness 5 mm), pair off the test samples so as to have a gluing surface of about 400 mm$^2$ and leave to dry at room temperature for 20 minutes. Pass the pair of test samples in a press for 30 seconds at a pressure of 2 Bar.

Method for Evaluating the Glue

The tacking strength is evaluated in peeling tests at room temperature, according to the ISO 868 regulation, immediately, 1.4 and 48 hours and 8 days after the preparation of the test samples.

The heat resistance, on the other hand, is measured by subjecting the test samples to constant stretching under the following conditions:

Hanging the test samples, in threes, to an arm, in an oven at an increasing temperature programmed at 2° C./min.

Hanging a weight of 500 grams to the second arm and registering the elongation over a period of time.

Indicating, on a diagram, the length of the ungluing in relation to the temperature until detachment.

Marking the tangents at the initial and final points of the curve; the intersection of the two tangents corresponds to the heat resistance temperature.

The following examples are provided for a better understanding of the present invention.

EXAMPLE 1

1a) Preparation of the First Polymeric Latex 850 g of water, 52.7 g of dodecylbenzene sodium sulphonate (aqueous solution at 6%) were charged into a 5 liter polymerization reactor. The mixture was stirred at 300 rpm under nitrogen and heated to 70° C. 3.3 g of tertiary dodecyl mercaptan, 135 g of styrene, 39 g of acrylonitrile, 111 g of butadiene, 110 g of sodium acrylate (aqueous solution at 15% at pH=5) and 210 g of ammonium persulphate (aqueous solution at 5%) were added at this temperature. After an hour of reaction, the following products were fed to the reactor over a period of 5 hours: 765 g of styrene, 12 g of tertiary dodecyl mercaptan, 221 g of acrylonitrile, 629 g of butadiene, 630 g of sodium acrylate (aqueous solution at 15% at a pH=5) and 387 g of dodecylbenzene sodium sulphonate (aqueous solution at 6%). After 4 hours of feeding, the reactor was brought to a temperature of 90° C. At the end of all the feedings, the latex remained at the same temperature for a further 2 hours and was subsequently cooled and filtered.

In all, the total amount of monomers fed is as follows: Styrene=44.8% by weight; Butadiene=36.8%; Acrylonitrile=12.9% by weight; Sodium acrylate 5.5% by weight.

1b) Polymerization with Chloroprene of the Latex Prepared in Example 1a 428 g of the latex prepared in Example 1a), 1976 g of chloroprene, 1050 g of water, 2.2 g of n-dodecyl mercaptan and 4.3 g of trisodium phosphate were charged into a 5 liter polymerization reactor. The mix was stirred at 200 rpm under nitrogen and cooled to 10° C. 53 g of sodium dithionite (aqueous solution at 2%) and 55 g of sodium persulfphate (aqueous solution at 2%) were fed to the reactor, at this temperature, over a period of 14 hours. After a few hours of polymerization, upon reaching 15% of solid, 260 g of potassium resinate (aqueous solution at 12%) were fed over a period of 7 hours. The reaction was interrupted at 92% of conversion by the introduction of a solution of phenothiazine. The non-reacted monomer was removed by distillation is a vapour stream at reduced pressure. The composite particles of the final latex have a PCP content of 90% by weight (10% consisting of the polymeric particles of the first aqueous latex), with a total carboxylation degree of about 0.5%. The final latex was formulated according to the quantities of Table 1. The tacking and heat resistance evaluations are indicated in Table 2.

EXAMPLE 2

2a) Preparation of the First Polymeric Latex

The same procedure is adopted as in Example 1a.

2b) Polymerization with Chloroprene of the Latex Prepared in Example 2a 953 g of the latex prepared in Example 2a), 2047 g of chloroprene, 1270 g of water, 2.5 g of n-dodecyl mercaptan and 5.3 g of trisodium phosphate were charged into a 5 liter polymerization reactor. The mixture was stirred at 200 rpm under nitrogen and cooled to 10° C. 43 g of sodium dithionite (aqueous solution at 2%) and 45 g of sodium persulfphate (aqueous solution at 2%) were fed to the reactor, at this temperature, over a period of 12 hours. After a few hours of polymerization, upon reaching 22% of solid, 260 g of potassium resinate (aqueous solution at 12%) were fed to the reactor over a period of 7 hours. The reaction was interrupted at 94% of conversion by the introduction of a solution of phenothiazine. The non-reacted monomer was removed by distillation is a vapour stream at reduced pressure. The composite particles of the final latex have a PCP content of 80% by weight (the remaining 20% consisting of the polymeric particles of the first aqueous latex), with a total carboxylation degree of about 1%. The final latex was formulated according to the quantities of Table 1. The tacking and heat resistance evaluations are indicated in Table 2.

EXAMPLE 3

3a) Preparation of the First Polymeric Latex

The same procedure is adopted as in Example 1a).

3b) Polymerization with Chloroprene of the Latex Prepared in Example 3

The same procedure is adopted as in Example 2b) but at a conversion of 65%. The composite particles of the final latex have a PCP content of 70% by weight (the remaining 30% consisting of the polymeric particles of the first aqueous latex), with a total carboxylation degree of about 1.5%. The final latex was formulated according to the quantities of Table 1. The tacking and heat resistance evaluations are indicated in Table 2.

COMPARATIVE EXAMPLE 1

1830 g of chloroprene, 620 g of water, 1.8 g of n-dodecyl mercaptan and 750 g of potassium resinate (aqueous solution at 10.5%) were charged into a 5 liter polymerization reactor. The mixture was stirred at 200 rpm under nitrogen and cooled to 10° C. 60 g of sodium dithionite (aqueous solution at 1%) and 68 g of sodium persulfphate (aqueous solution at 1%) were fed to the reactor, at this temperature, over a period of 12 hours. The reaction was interrupted at 95% of conversion by the introduction of a solution of phenothiazine. The non-reacted monomer was removed by distillation in a vapour stream at reduced pressure. The final latex was formulated according to the quantities of Table 1. The tacking and heat resistance evaluations are indicated in Table 2.

COMPARATIVE EXAMPLE 2

Mechanical blend of two latices consisting of 10 parts of the polymer prepared in Example 1a) containing 90 parts of the polymer prepared in Comparative example 1. The final latex was formulated according to Table 1. The tacking and heat resistance evaluations are indicated in Table 2.

COMPARATIVE EXAMPLE 3

1782 g of chloroprene, 720 g of water, 1.8 g of n-dodecyl mercaptan, 18 g of methacrylic acid (AMA) and 750 g of DBS (aqueous solution at 6%) were charged into a 5 liter polymerization reactor. The mixture was stirred at 200 rpm under nitrogen and cooled to 10° C. 70 g of sodium dithionite (aqueous solution at 1%) and 68 g of sodium persulfphate (aqueous solution at 1%) were fed to the reactor, at this temperature, over a period of 16 hours. The reaction was interrupted at 91% of conversion by the introduction of a solution of phenothiazine. After the addition of phenothiazine, 740 g of potassium resinate (aqueous solution at 10%) were then added. The non-reacted monomer was removed by distillation in a vapour stream at reduced pressure. The polymer obtained has a carboxylation degree of about 1% of AMA by weight. The final latex was formulated according to the quantities of Table 1. The tacking and heat resistance evaluations are indicated in Table 2.

COMPARATIVE EXAMPLE 4

1764 g of chloroprene, 720 g of water, 1.8 g of n-dodecyl mercaptan, 36 g AMA and 750 g of DBS (aqueous solution at 6%) were charged into a 5 liter polymerization reactor. The mixture was stirred at 200 rpm under nitrogen and cooled to 10° C. 60 g of sodium dithionite (aqueous solution at 1%) and 58 g of sodium persulfphate (aqueous solution at 1%) were fed to the reactor, at this temperature, over a period of 14 hours. The reaction was interrupted at 90% of conversion by the introduction of a solution of phenothiazine. After the addition of phenothiazine, 740 g of potassium resinate (aqueous solution at 10%) were then added. The non-reacted monomer was removed by distillation is a vapour stream at reduced pressure. The polymer obtained has a carboxylation degree of about 2% of AMA by weight. The final latex was formulated according to the quantities of Table 1. The tacking and heat resistance evaluations are indicated in Table 2.

COMPARATIVE EXAMPLE 5

1746 g of chloroprene, 720 g of water, 1.8 g of n-dodecyl mercaptan, 54 g AMA and 750 g of DBS (aqueous solution at 6%) were charged into a 5 liter polymerization reactor. The mixture was stirred at 200 rpm under nitrogen and cooled to 10° C. 60 g of sodium dithionite (aqueous solution at 1%) and 58 g of sodium persulfphate (aqueous solution at 1%) were fed to the reactor, at this temperature, over a period of 14 hours. The reaction was interrupted at 90% of conversion by the introduction of a solution of phenothiazine. After the addition of phenothiazine, 740 g of potassium resinate (aqueous solution at 10%) were then added. The non-reacted monomer was removed by distillation is a vapour stream at reduced pressure. The polymer obtained has a carboxylation degree of about 3% of AMA by weight. The final latex was formulated according to the quantities of Table 1. The tacking and heat resistance evaluations are indicated in Table 2.

COMPARATIVE EXAMPLE 6

Neoprene Aquastick® 1120 latex supplied by Dupont Dow Elastomers. This is a latex which is commercialized as high performance CP and AMA copolymer. The latex was formulated according to the quantities of Table 1. The tacking and heat resistance evaluations are indicated in Table 2.

COMPARATIVE EXAMPLE 7

Neoprene Aquastick® 2540 latex supplied by Dupont Dow Elastomers. This is a latex of PCP homopolymer which is commercialized as a latex for adhesives with a high heat resistance. The tacking and heat resistance evaluations are indicated in Table 2.

Comments on Table 2

The first part of Table 2 (part A) indicates the main physico-chemical characteristics of the latices prepared with the present invention compared with the comparative examples. Part B of Table 2 specifies the evaluations obtained with tacking, using a resin-free formulation and the heat resistance values obtained; whereas part C indicates the same tacking evaluations effected but using a blend containing an NOPCO resin. It should be noted that in all cases, the examples prepared according to the present invention provided extremely high heat resistance values (from 105° C. to 130° C.) and higher than all the comparative examples, both with polychloroprene alone (see comparative examples 1 and 7), and with the mechanical mixture of PCP latex with the polymer latex (a) (see comparative example 2), and also with the latices prepared for the copolymerization of CP with AMA (see comparative examples 3, 4 and 5). The only exception was comparative example 6 (carboxylated latex Acquastick® 1120 of Du Pont-Dow Elastomers), which gave a heat resistance of 140° C.

As far as the latices prepared with the present invention are concerned, it can be observed that the heat resistance tends to deteriorate with a decrease in the CP content.

With respect to cotton/cotton tacking, the best results were obtained with comparative examples 1 and 7, which are the only non-carboxylated latices; this is the only application however in which the two latices are higher, whereas the tacking on other supports, also including the heat resistance, proves to be completely insufficient.

The carboxylated latex Acquastick® 1120, indicated as comparative example 6, is the only latex which gave reasonable results in terms of tacking strength and heat resistance. Although this latex has an excellent heat resistance (140° C. with respect to a maximum of 130° C. of example 1 of the invention), it has lower tacking strength values on the various supports in all cases and under all the conditions with respect to examples 1, 2 and 3 prepared according to the present invention.

On observing part C of Table 2, it can also be noted that in the formulation of the latex with NOPCO resin, the tacking strength of all the latices prepared according to the present invention is much higher on wood/wood and wood/Formica supports with respect to all the comparative examples indicated in Table 2.

In conclusion, examples 1, 2 and 3 prepared according to the present invention represent an excellent compromise between a good heat resistance and a high tacking strength both immediately and over a long period of time on all the supports considered.

TABLE 2

| | Examples of the invention | | | Comparative examples | | | | | | | |
|---|---|---|---|---|---|---|---|---|---|---|---|
| | | | | 1 | 2 Mechanical mix | 3 Copolymer CP/1 AMA | 4 Copolymer CP/2 AMA | 5 Copolymer CP/3 AMA | 6 Acquastick 1120 | 7 Acquastick 2540 | |
| | 1 | 2 | 3 | PCP | | | | | | | |
| Polymer a) % | 10 | 20 | 30 | 0 | 10 | — | — | — | — | — | A |
| CP % as polymer b) | 90 | 80 | 70 | 100 | 90 | — | — | — | — | — | |
| carboxylating agent % | 0.5 | 1 | 1.5 | 0 | 0.5 | 1 | 2 | 3 | nd | 0 | |
| Conversion | 92 | 94 | 65 | 95 | — | 91 | 90 | 94 | — | — | |
| gel (macro/micro) % | 91/1 | 96/1 | 65/1 | 72/1 | 85/2 | 65/2 | 70/2 | 72/1 | 55/0 | 93/0 | |
| Resin-free latex tacking strength | | | | | | | | | | | |
| Cotton/cotton (kg/cm) immediate | 2.2 | 2.3 | 2.1 | 2.4 | 2 | 1.8 | 1.5 | 0.9 | 1.3 | 2.7 | B |
| 1 h | 3.3 | 2.4 | 2.5 | 3 | 2.5 | 2.1 | 2 | 1.4 | 2.1 | 4.1 | |
| 48 h | 2.3 | 3 | 3 | 4.4 | 3 | 3.1 | 2.8 | 2.2 | 2.2 | 4.8 | |
| Wood/wood (kg/cm2) immediate | 24 | 27 | 22 | 3 | 6 | 4 | 7 | 9 | 19 | 15 | |
| 4 h | 33 | 33 | 36 | 15 | 17 | 17 | 15 | 18 | 34 | 12 | |
| 8 days | 45 | 45 | 51 | 21 | 20 | 20 | 24 | 25 | 45 | 20 | |
| Wood/formica (kg/cm2) immediate | 13 | 21 | 13 | 6 | 8 | 6 | 4 | 5 | 12 | 7 | |
| 4 h | 26 | 30 | 26 | 9 | 12 | 7 | 8 | 8 | 24 | 13 | |
| 8 days | 37 | 39 | 34 | 9 | 15 | 5 | 5 | 7 | 27 | 13 | |
| Heat resistance ° C. | 130 | 120 | 105 | 60 | 75 | 73 | 82 | 95 | 140 | 85 | |
| Tacking strength of latex formulated with the resin NOPCO | | | | | | | | | | | |
| Cotton/cotton (kg/cm) immediate | 1.6 | 0.6 | 1.2 | 1.7 | 2 | 1.3 | 1.7 | 1.6 | 1.4 | 2 | C |
| 1 h | 2.4 | 1.2 | 1.7 | 1.8 | 2.2 | 2.8 | 2.4 | 2.5 | 1.7 | 2.3 | |
| 48 h | 2.7 | 2.2 | 2.5 | 2.8 | 2.9 | 2.3 | 3.2 | 3 | 2.7 | 3.5 | |
| Wood/wood (kg/cm2) immediate | 27 | 20 | 22 | 12 | 15 | 12 | 14 | 16 | 19 | 14 | |
| 4 h | 34 | 35 | 31 | 15 | 18 | 18 | 21 | 24 | 26 | 17 | |
| 8 days | 50 | 53 | 58 | 18 | 25 | 24 | 27 | 30 | 33 | 22 | |
| Wood/formica (kg/cm2) immediate | 28 | 27 | 21 | 10 | 14 | 12 | 13 | 15 | 19 | 11 | |
| 4 h | 30 | 27 | 28 | 12 | 17 | 17 | 19 | 20 | 24 | 15 | |
| 8 days | 47 | 42 | 39 | 15 | 20 | 22 | 25 | 26 | 27 | 20 | |

The invention claimed is:

1. A process for the preparation of a latex based on polychloroprene; comprising
polymerizing chloroprene in the presence of a first latex to form a final latex;
wherein the first latex comprises particles of a polymer comprising reacted units of (a) one or more α,β-unsaturated carboxylic acids in a quantity of from 2% to 25% by weight, (b) one or more vinyl aromatic compounds in a quantity of from 40 to 60% by weight, and (c) one or more conjugated dienes in a quantity of from 20% to 55% by weight; and
wherein the sum of components (a)+(b)+(c) is equal to 100% by weight; and
wherein the final latex comprises solid particles comprising from 50 to 95% by weight of reacted chloroprene.

2. The process according to claim 1, wherein the polymer of the first latex has a content of reacted units of the (a) α,β-unsaturated carboxylic acids of from 2% to 8% by weight.

3. The process according to claim 1, wherein the polymer comprises the (a) α,β-unsaturated carboxylic acids, in a quantity of from 5% to 22% by weight, the (b) vinyl aromatic compounds in a quantity of from 42 to 48% by weight, and the (c) conjugated dienes in a quantity of from 30% to 40% by weight.

4. The process according to claim 1, wherein the vinyl-aromatic compound is styrene.

5. The process according to claim 1, wherein the (c) conjugated diene is 1,3-butadiene.

6. The process according to claim 1, wherein the (a) α,β-unsaturated carboxylic acids are salts of alkaline metals of (meth)acrylic acid.

7. The process according to claim 1, wherein the polymer of the first latex further comprises reacted units of chloroprene in a quantity not exceeding 15% by weight.

8. The process according to claim 7, wherein the polymer of the first latex further comprises chloroprene in a quantity not exceeding 10%.

9. The process according to claim 1, wherein the solid particles of the final latex comprise reacted units of chloroprene in an amount of from 80 to 95% by weight.

10. A latex prepared according to the process of claim 1.

11. An adhesive comprising the latex of claim 10.

12. A cotton/cotton, wood/wood or wood/formica adhesive comprising the adhesive of claim 10.

13. The process as claimed in claim 1, wherein the polymer of the first latex consists essentially of reacted monomer units of the (a) α,β-unsaturated carboxylic acid, the (b) vinyl aromatic compound, and the (c) conjugated diene.

14. The process as claimed in claim 1, wherein the α,β-unsaturated carboxylic acid is at least one selected from the group consisting of acrylic acid, methacrylic acid, a salt of acrylic acid and a salt of methacrylic acid; the vinyl aromatic compound is at least one selected from the group consisting of styrene, α-methyl styrene, ethyl styrene, butyl styrene, and dimethyl styrene; and the conjugated diene is at least one selected from the group consisting of isoprene, 1,3-butadiene, 2,3-dichloro-1,3-butadiene, and 1-chloro-1,3-butadiene.

15. The process as claimed in claim 1, wherein the polymer of the first latex is obtained by polymerizing a monomer mixture comprising the (a) α,β-unsaturated carboxylic acids, the (b) vinyl aromatic compounds, and the (c) conjugated dienes.

16. The process as claimed in claim 1, wherein the (b) vinyl aromatic compound is styrene; and the conjugated diene is 1,3-butadiene.

17. The process as claimed in claim 1, wherein the polymer of the first latex further comprises reacted units of a derivative of the (a) α,β-unsaturated carboxylic acids.

18. The process as claimed in claim 1, wherein the solid particles of the final latex comprise chloroprene in an amount of from 80 to 95% by weight.

19. The process according to claim 1, wherein the solid particles of the final latex comprise from 50 to 80% by weight of chloroprene.

20. The process according to claim 1, wherein the polymerizing is started by radicals generated by thermal decomposition.

21. The process according to claim 1, further comprising: removing water from the final latex.

22. The process according to claim 1, wherein the αβ-unsaturated carboxylic acids in the polymer consist of reacted units of sodium acrylate in the salt form.

23. A process for the preparation of a polychloroprene latex, comprising:

polymerizing chloroprene in the presence of a first latex to form a final latex;

wherein the first latex comprises polymer particles comprising reacted units of a salt of an α,β-unsaturated carboxylic acid, (b) one or more vinyl aromatic compounds, and (c) one or more conjugated dienes; and wherein the polymer of the polymer particles of the first latex consist of reacted units of (a), (b) and (c); and wherein the final latex comprises solid particles comprising from 50-95% by weight of polychloroprene.

24. The process according to claim 23, wherein the first latex comprises polymer particles consisting of sodium acrylate, acrylonitrile, butadiene and styrene.

25. The process according to claim 23, wherein the polymer consists of the (a) α,β-unsaturated carboxylic acids in a quantity of from 5% to 22% by weight, the (b) vinyl aromatic compounds in a quantity of from 42 to 48% by weight, and the (c) conjugated dienes in a quantity of from 30% to 40% by weight; and wherein the polymer consists of reacted units of sodium acrylate, acrylonitrile, butadiene and styrene.

* * * * *